| United States Patent [19] | [11] | 4,092,135 |
|---|---|---|
| Dussaussoy et al. | [45] | May 30, 1978 |

[54] ASSEMBLY OF TUBES FOR ISOTOPIC SEPARATION DIFFUSERS

[75] Inventors: Pierre Dussaussoy, Bollene; Pierre Mongin, Piolenc; René Rouviere, Orange; Gilbert Simon, Sevres, all of France

[73] Assignee: Commissariat a l'Energie Atomique, Paris, France

[21] Appl. No.: 377,506

[22] Filed: Jul. 12, 1973

[30] Foreign Application Priority Data

Aug. 10, 1972  France .................................. 72.28961

[51] Int. Cl.² ............................................. B01D 13/00
[52] U.S. Cl. ........................................ 55/158; 55/342; 55/482; 55/490
[58] Field of Search ................... 55/158, 342, 482, 490

[56] References Cited

U.S. PATENT DOCUMENTS

| 3,262,251 | 7/1966 | Hicks | 55/158 |
| 3,339,341 | 9/1967 | Maxwell et al. | 55/158 |

*Primary Examiner*—Stephen J. Lechert, Jr.
*Attorney, Agent, or Firm*—Cameron, Kerkam, Sutton, Stowell & Stowell

[57] ABSTRACT

The invention relates to a tube assembly for use in isotopic separation diffusers. Each tube assembly is secured at each end to an end-plate and comprises a number of filter tubes assembled by fitting together adjacent ends which are provided with inter-fitting spigots having a diameter greater than that of the body of the tube. The assembled tubes are connected together in bundles by means of resilient means located at the level of the spigots so that the tubes make contact with each other via the abutting spigots.

9 Claims, 4 Drawing Figures

ASSEMBLY OF TUBES FOR ISOTOPIC SEPARATION DIFFUSERS

The invention relates to an assembly of tubes for isotopic separation diffusers.

In the gaseous diffusion technique, it is conventional practice for diffusers to be made up of a stack of sub-assemblies comprising machined plates and secured by spacers. Each metal end of a barrier is expanded at one of the plates.

The prior art arrangement has the disadvantage of requiring a large number of plates per diffuser. Since the plates are machined with high accuracy, they are expensive, which makes the method much less economic.

If, furthermore, it is desired to apply this technique to a factory having a large output, the diameter and thickness of the plates need to be very large or even prohibitive, in view of the relatively large "pitch" needed for assembly requirements.

Attempts have been made to lighten or eliminate the plates by using an assembly comprising a bundle of "candles". Each candle is an assembly of filter tubes placed end-to-end and joined by brazing their metal spigots. Unless intermediate plates are used, however, it becomes difficult to stabilize the vibrations of the candles. Hitherto, this problem has been solved by "lateral bracing" by clamping. This method requires manual assembly, which is long, laborious, difficult to mechanize and consequently less reliable.

The main object of the invention is to eliminate the disadvantages of the aforementioned assemblies. To this end, the invention provides an assembly or "bundle" of tubes which can be easily, rapidly and economically assembled. It applies to candles made up of filter tubes connected at each end to an end-plate, usually to a top plate and a bottom plate, the filter tubes forming each candle being assembled by fitting and brazing the skirts at the end of their spigots.

The invention is characterised in that the candles are assembled in one or more bundles by resilient tightening means at the level of the spigots, which are slightly larger in diameter than the filter tube bodies, so that the candles in a single bundle make contact via the skirts of the spigots.

In one embodiment of the invention, the candles are distributed around a central tubular mast secured to the end-plates. One plate can be mounted in floating manner so that the mast has axial clearance. The candles are secured together by being encircled with peripheral metal hoops at the level of the spigots.

According to another embodiment, the central mast is a lattice construction having a polygonal cross-section and allowing gases to flow at low pressure. Layers of polygonal structures in the form of a star having a number of arms are threaded on the central lattice mast, and sectional hoops or collars are resiliently connected between the arms of each structure so as to tighten the bundles disposed between the arms.

In another embodiment, the central mast is not indispensable and the candles are distributed over the entire area of the end-plates. They are assembled either side-by-side or between the arms of the polygonal star-shaped structures. In both cases, the bundle of candles is centred by resilient cambered strips secured between the hopps or collars, their camber resiliently bearing on the inner wall of the diffuser casing or containment.

The pitch at which the tubes are grouped into filter "candles" on the end-plates is usually equal to the outer diameter of the intermediate spigots.

The following description refers to embodiments of the invention described with reference to the accompanying drawings, in which.

Figure 1:
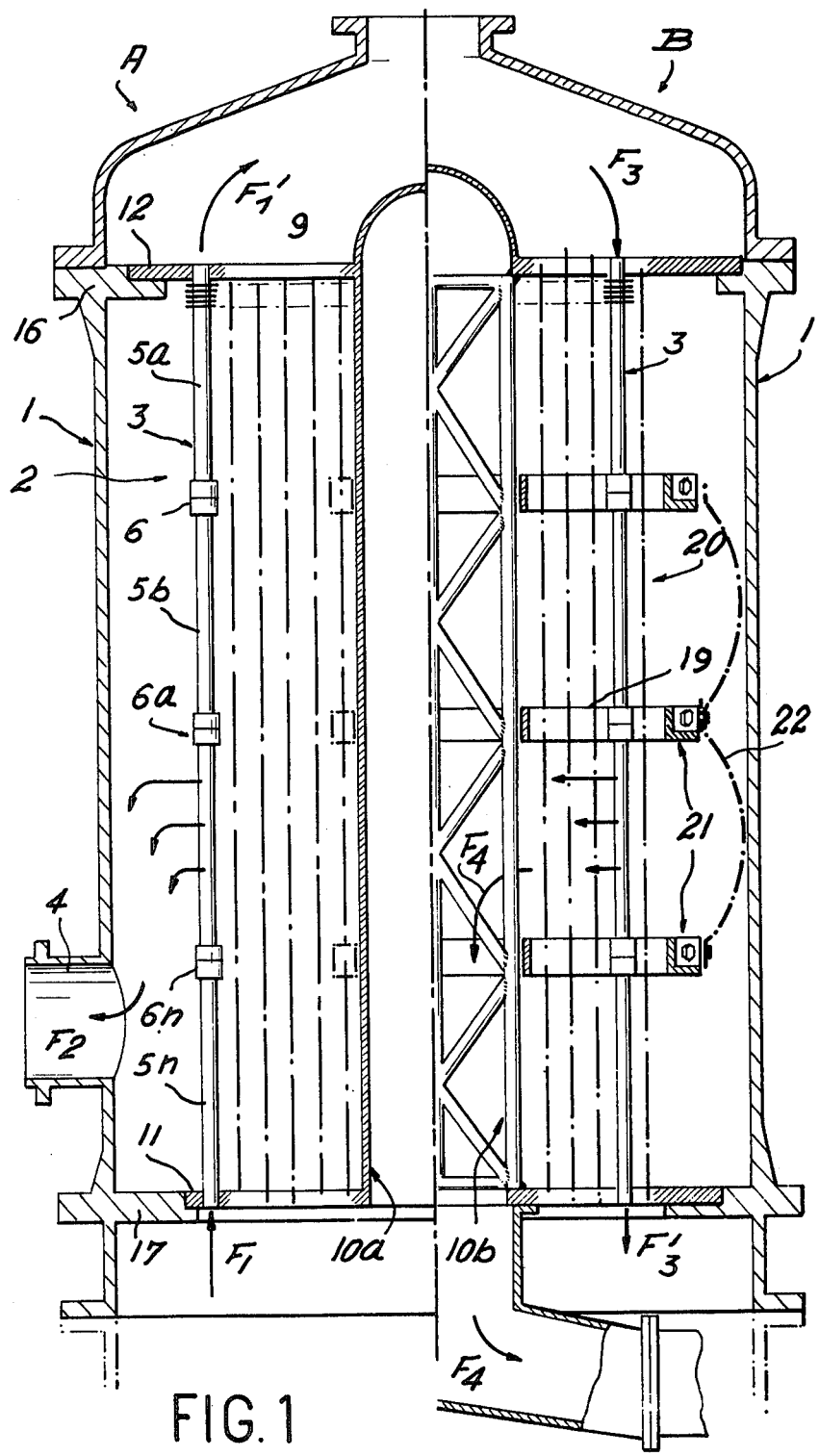
FIG. 1 is a diagrammatic view in elevation of the assembly according to the invention.
Figure 2:
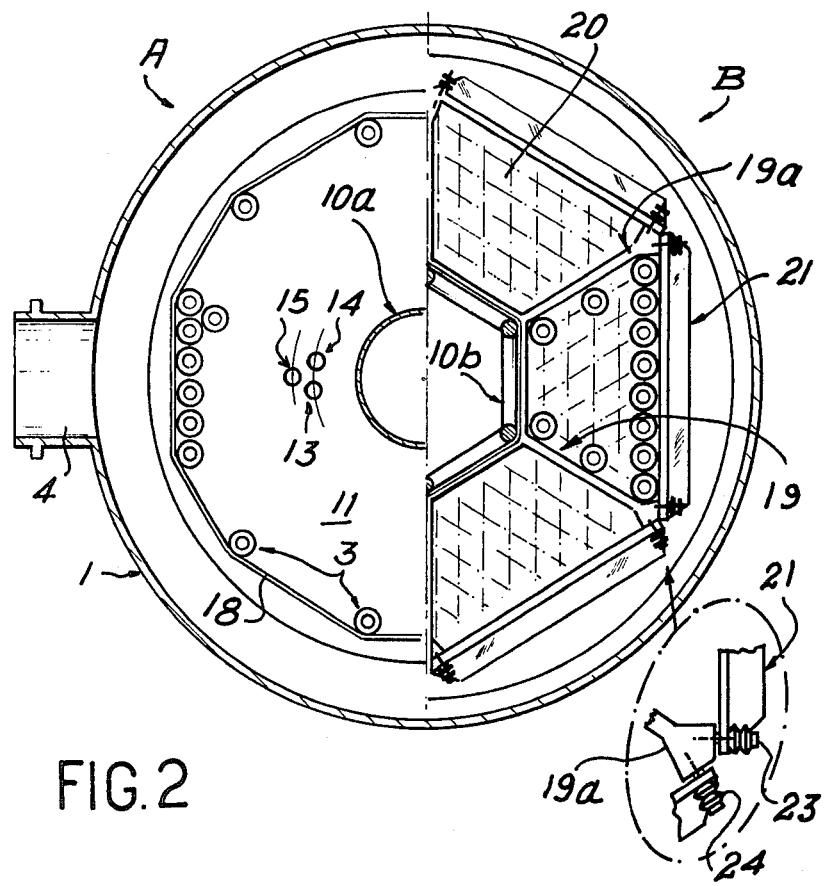
FIG. 2 is a cross-section in plan of FIG. 1.

FIGS. 1 and 2 diagrammatically represent a diffuser having an outer casing which encloses gas diffusion barriers 2 assembled to form "candles". In FIG. 1 (Part A), gases at high pressure are introduced at the bottom of filter tubes 3 and escape at the top (arrows $F_1 - F'_1$). After diffusion through the tube walls, the gases emerge at low pressure through a lateral tube 4 (arrows $F_2$). In FIG. 1 (Part B) gases at high pressure are introduced at the top of tubes 3 and escape at the bottom (arrows $F_3 - F'_3$). After diffusing through the walls of tubes 3, the gases emerge at low pressure via a perforated central tube 10b (arrows $F_4$). The paths along which the gases flow do not form part of the invention and are described only to facilitate understanding of the description.

Figure 3:
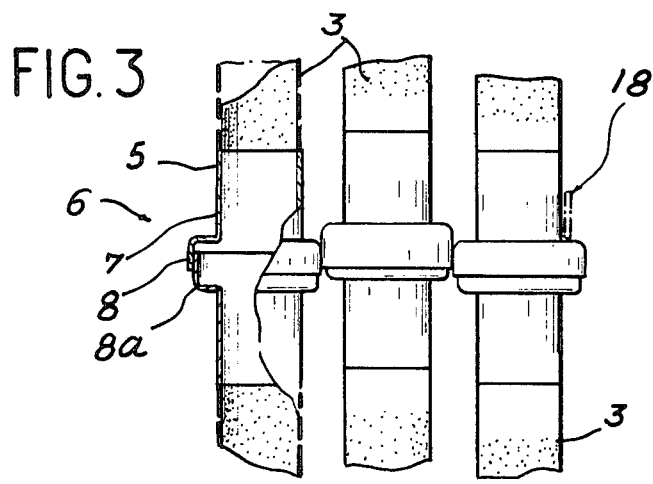
FIG. 3 is a detail of an embodiment of the invention.

According to the invention, the filter tubes 3 are made up of elements 5, 5a . . . 5n assembled by brazing intermediate spigots 6, 6a . . . 6n to one another (FIGS. 1 and 3). Each intermediate spigot 6 comprises a body 7 (FIG. 3) having a diameter approximately equal to that of tube 3, and a skirt 8 having a slightly greater diameter. Each body 6 is brazed to the corresponding end of a tube, and its skirt 8 is fitted and brazed on to the skirt 8a of the other, adjacent spigot. The outer diameter of a female skirt 8 is slightly greater than the outer diameter of the tube.

A number of known methods can be used for absorbing differences in longitudinal expansion between the candles and the casing or between the candles and the central mast; use can be made e.g. of expansion bellows 9 at the candle ends, or of floating plates, in which case a large-diameter compensator (not shown) provides sealing-tightness between the plate and the casing (and the central mast if necessary).

In FIGS. 1 and 2 (Parts A) a central mast 10a having an unbroken wall is secured between two end-plates 11, 12 formed with apertures 13, 14, 15 having a distance between axes or pitch which is equal to the maximum outer diameter of a female skirt 8. End-plates 11, 12 are secured on shoulders 16, 17 of casing 1. End-plate 11 can be allowed to float, by not securing it on flange 17.

Filter tubes 3 are expanded in end-plates 11, 12 to form a bundle resiliently secured by hoops or collars 18 (FIGS. 2A, 3), e.g. steel hoops used for packing. Hoops 18 bear tangentially on the bodies 7 of the spigots at the periphery of the bundle, so that the female skirts 8 are wedged against one another, thus reliably securing the bundle of tubes 3 (see detail in FIG. 3).

In FIGS. 1 and 2 (Parts B) the central cylindrical mast is replaced by a lattice mast 10b having a polygonal cross-section and secured between the two end-plates 11, 12 mounted on shoulders 16, 17 of casing 1. The wall of mast 10b is of perforated construction, thus allowing gas to flow at low pressure (arrow $F_4$).

Polygonal structures 19 in the form of a star having a number of arms are threaded on mast 10b and bound trapezoidal spaces 20 on the end-plates 11, 12, which are formed with apertures having the pitch defined hereinbefore.

The filter tubes 3 assembled as shown in FIG. 3 are expanded in the apertures of end-plates 11, 12, forming bundles resiliently secured between arms 19a of structures 19 by two sectional hoops 21 secured between arms 19a of structures 19 by two sectional hoops 21 secured between arms 19a by bolts 23, with interposition of resilient washers 24.

Figure 4:
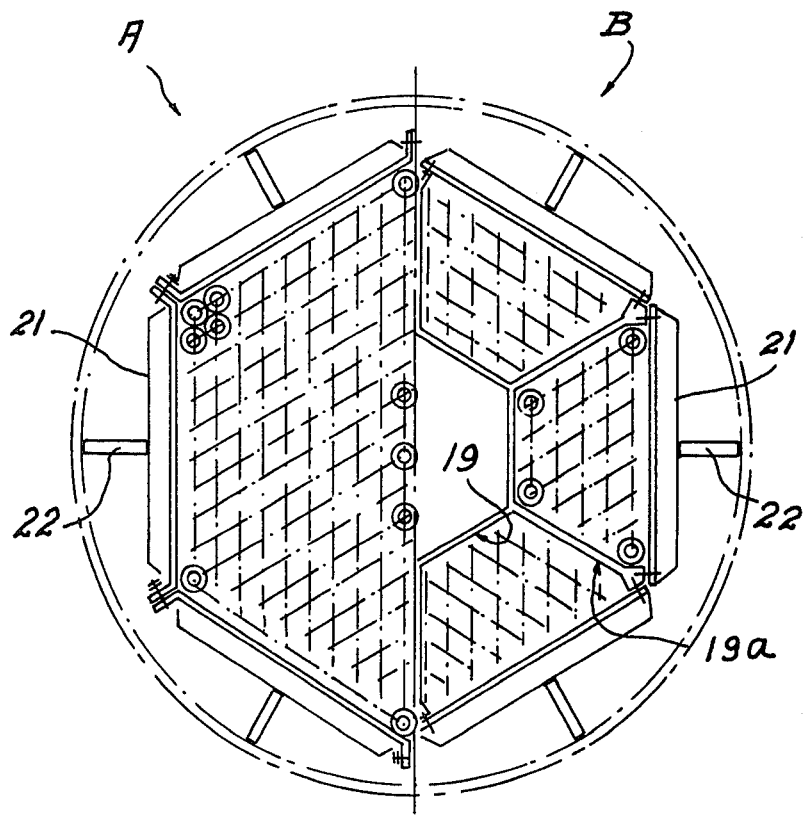
FIG. 4 is a sectional view in plan of an alternative embodiment.

In an alternative embodiment, the central mast is omitted and the candles are distributed over the entire area of members 11, 12. In this case, the candles are assembled either side by side (Section A of FIG. 4) or between the arms 19a of structures such as 19 described hereinbefore (Section B of FIG. 4). The candles are centred in the axis of casing 1 by cambered resilient strips 22 which are secured between hoops 21 in the longitudinal direction of tubes 3, the cambered part of strips 21 bearing on the inner wall of the diffuser casing 1.

The tube assembly according to the invention is particularly suitable for isotopic separation diffusers and for heat exchangers made up of bundles of tubes.

We claim:

1. An assembly of tubes for isotopic separation diffusers comprising candles made up of filter tubes and secured at each end to a bottom plate and a top plate, the filter tubes of each candle being assembled by fitting together and brazing the skirts at the end of their spigots, the candles being assembled in one bundle by resilient tightening means at at least the level of the spigots, which are slightly larger in diameter than the filter tube bodies, so that the candles in a single bundle make contact via the skirts of the spigots.

2. A tube assembly according to claim 1, wherein the candles are distributed around a central mast.

3. A tube assembly according to claim 2, wherein the central mast is tubular and secured to the end-plates.

4. A tube assembly according to claim 2, wherein the central mast is tubular and slides with respect to one of the end-plates.

5. A tube assembly according to claim 1 the means for resiliently tightening the candles are metal strips or hoops.

6. A tube assembly according to claim 2, wherein the central mast is a lattice construction having a polygonal section enabling gases to flow at low pressure.

7. A tube assembly according to claim 1 layers of polygonal structures in the form of a star having a number of arms and threaded on the central lattice mast, and also comprises sectional hoops, rings or collars resiliently connected between the arms of each structure in order to tighten the bundles.

8. A tube assembly according to claim 1, comprising layers of polygonal structures in the form of a star having a number of arms, sectional hoops, rings or collars resiliently connected between the arms of each structure so as to tighten the bundles, and resilient cambered strips secured in the longitudinal direction of the bundles between the hoops or collars of the successive layers of structures, a cambered part of the strips bearing on the inner wall of the diffuser casing.

9. A tube assembly according to claim 1, wherein the candles are disposed side by side over the entire surface of the end-plates, layers of sectional hoops or collars resiliently connected to one another surround the candles, and resilient cambered strips are secured in the longitudinal direction of the candles between the hoops or collars of each layer, a cambered part of the strips bearing on the inner wall of the diffuser casing.

* * * * *